(12) United States Patent
Sullivan et al.

(10) Patent No.: US 8,504,929 B2
(45) Date of Patent: Aug. 6, 2013

(54) EDITING USER INTERFACE COMPONENTS

(75) Inventors: Blake Sullivan, Redwood City, CA (US); Edward J. Farrell, Los Gatos, CA (US); Andrew Schwartz, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 662 days.

(21) Appl. No.: 12/101,606

(22) Filed: Apr. 11, 2008

(65) Prior Publication Data
US 2009/0259950 A1  Oct. 15, 2009

(51) Int. Cl.
G06F 3/00 (2006.01)
G06F 3/048 (2013.01)
G06F 3/033 (2013.01)
G06G 3/00 (2006.01)

(52) U.S. Cl.
USPC ........... 715/760; 715/751; 715/762; 715/763; 715/853; 715/863

(58) Field of Classification Search
USPC .................. 715/751, 760, 762, 763, 853, 863
See application file for complete search history.

(56) References Cited

U.S. PATENT DOCUMENTS

| | | | | |
|---|---|---|---|---|
| 6,133,915 A * | 10/2000 | Arcuri et al. | | 715/779 |
| 6,476,828 B1 * | 11/2002 | Burkett et al. | | 715/760 |
| 6,738,964 B1 * | 5/2004 | Zink et al. | | 717/105 |
| 7,191,394 B1 * | 3/2007 | Ardeleanu et al. | | 715/241 |
| 7,366,991 B1 * | 4/2008 | Snapkauskas et al. | | 715/762 |
| 7,412,689 B1 * | 8/2008 | Quinn et al. | | 717/107 |
| 7,698,631 B1 * | 4/2010 | Toebes | | 715/234 |
| 2002/0069204 A1 * | 6/2002 | Kahn et al. | | 707/10 |
| 2002/0073125 A1 | 6/2002 | Bier | | |
| 2002/0078140 A1 * | 6/2002 | Kelly et al. | | 709/203 |
| 2002/0129052 A1 * | 9/2002 | Glazer et al. | | 707/501.1 |
| 2002/0154166 A1 * | 10/2002 | Sanders et al. | | 345/764 |
| 2003/0043192 A1 * | 3/2003 | Bouleau | | 345/762 |
| 2003/0048269 A1 * | 3/2003 | Powell et al. | | 345/420 |
| 2003/0074634 A1 * | 4/2003 | Emmelmann | | 715/513 |
| 2003/0184585 A1 * | 10/2003 | Lin et al. | | 345/763 |
| 2003/0204810 A1 * | 10/2003 | Dam et al. | | 715/500 |
| 2003/0233614 A1 * | 12/2003 | Mohamed | | 715/501.1 |
| 2004/0021699 A1 * | 2/2004 | Fildebrandt | | 345/854 |
| 2004/0088653 A1 * | 5/2004 | Bell et al. | | 715/523 |
| 2004/0148576 A1 * | 7/2004 | Matveyenko et al. | | 715/530 |
| 2004/0205571 A1 * | 10/2004 | Adler et al. | | 715/513 |
| 2004/0205711 A1 * | 10/2004 | Ishimitsu et al. | | 717/116 |

(Continued)

FOREIGN PATENT DOCUMENTS

JP  07006030 A  *  1/1995

OTHER PUBLICATIONS

Rathbone, Andy, "Windows XP for Dummies, 2nd Edition," Wiley Publishing, Inc., 2004, p. 70.*

(Continued)

*Primary Examiner* — Kieu Vu
*Assistant Examiner* — Eric J Bycer
(74) *Attorney, Agent, or Firm* — Miles & Stockbridge P.C.

(57) ABSTRACT

A system that executes a user editable application includes a user interface that includes a plurality of components organized in a tree structure. The system indicates which of the plurality of components may be editable by a user of the application. The system receives editing input from the user for an editable component, and then updates the component based on the editing input.

20 Claims, 11 Drawing Sheets

U.S. PATENT DOCUMENTS

| | | | | |
|---|---|---|---|---|
| 2004/0217985 | A9* | 11/2004 | Ries et al. | 345/740 |
| 2005/0091584 | A1* | 4/2005 | Bogdan et al. | 715/514 |
| 2005/0149206 | A1* | 7/2005 | Krane | 700/17 |
| 2005/0240869 | A1* | 10/2005 | Leetaru et al. | 715/530 |
| 2005/0289156 | A1* | 12/2005 | Maryka et al. | 707/100 |
| 2006/0005207 | A1 | 1/2006 | Louch et al. | |
| 2006/0020681 | A1* | 1/2006 | DePree et al. | 709/217 |
| 2006/0075352 | A1* | 4/2006 | Burke et al. | 715/763 |
| 2006/0090130 | A1* | 4/2006 | Bent et al. | 715/530 |
| 2006/0117248 | A1* | 6/2006 | Kurumai et al. | 715/513 |
| 2006/0150178 | A1* | 7/2006 | Jerrard-Dunne et al. | 717/168 |
| 2006/0153097 | A1* | 7/2006 | Schultz | 370/254 |
| 2006/0212806 | A1 | 9/2006 | Griffin et al. | |
| 2006/0248480 | A1* | 11/2006 | Faraday et al. | 715/866 |
| 2006/0250420 | A1* | 11/2006 | Backlund | 345/619 |
| 2007/0061710 | A1* | 3/2007 | Chartier et al. | 715/523 |
| 2007/0061715 | A1* | 3/2007 | Chartier et al. | 715/530 |
| 2007/0180386 | A1* | 8/2007 | Ballard et al. | 715/744 |
| 2007/0288424 | A1* | 12/2007 | Neil | 707/2 |
| 2008/0082572 | A1* | 4/2008 | Ballard et al. | 707/102 |
| 2008/0263462 | A1* | 10/2008 | Mayer-Ullmann et al. | 715/762 |
| 2008/0307328 | A1* | 12/2008 | Hatcher et al. | 715/760 |
| 2009/0083641 | A1* | 3/2009 | Christy | 715/760 |
| 2009/0164939 | A1* | 6/2009 | Ishimitsu et al. | 715/805 |
| 2009/0319879 | A1* | 12/2009 | Scott et al. | 715/205 |

OTHER PUBLICATIONS

Geary, David, "A First Look at JavaServer Faces," JavaWorld.com (part 1 published on Nov. 29, 2002-available at www.javaworld.com/javaworld/jw-11-2002/jw-1129-jsf.html; part 2 published on Dec. 27, 2002-available at www.javaworld.com/javaworld/jw-12-2002/jw-1227-jsf2.html).*

"The Java 5EE Tutorial," Sun Microsystems, 2007, chapters 9-13.*

Masoud et al., "asp.net and JSP Frameworks in Model View Controller Implementation," published as part of the Proceedings of Information and Communication Technologies 2006, vol. 2, pp. 3593-3598. 2006.*

"The DOM: Part 3—Styles and Implementations," 2007, retrieved form http://www.guistuff.com/javascript/js_dom_a3.html on Sep. 29, 2012.*

SSA 9.1.3 Integration Technologies "SAS Web Infrastructure Kit: Developers Guide, Creating a Portlet Template (Editable Portlet)", http://support.sas.com/rnd/itech/doc9/portal_dev/use_cases/dg_portlets_editable.html.

* cited by examiner

EDITING USER INTERFACE COMPONENTS

FIELD OF THE INVENTION

One embodiment is directed generally to a computer user interface, and in particular to editing components of a computer user interface.

BACKGROUND INFORMATION

As computer software applications increase in functionality and become more complicated, it can become more burdensome for a user to interact with the applications. The layout, design and content of the user interface of the application, which is the primary tool used by the user to interact with the application, increases in importance when efforts are made to make an application relatively easy to use.

In some instances, having a user customize a user interface may make an application easier to use. Unfortunately, most application user interfaces are written with fairly sophisticated computer code. The average user, who is likely not a computer programmer, may not have the desire or may not have the capability to rewrite computer code to implement any substantial amount of customization.

SUMMARY OF THE INVENTION

One embodiment is a system that executes a user editable application. The application includes a user interface that includes a plurality of components organized as a tree structure. The system indicates which of the component subtrees of the plurality of components may be editable by a user of the application. The system receives editing input from the user for an editable component, and then updates the component based on the editing input.

DETAILED DESCRIPTION

One embodiment is a user interface that included components that are easily editable by a user in order to customize the user interface.

Figure 1:
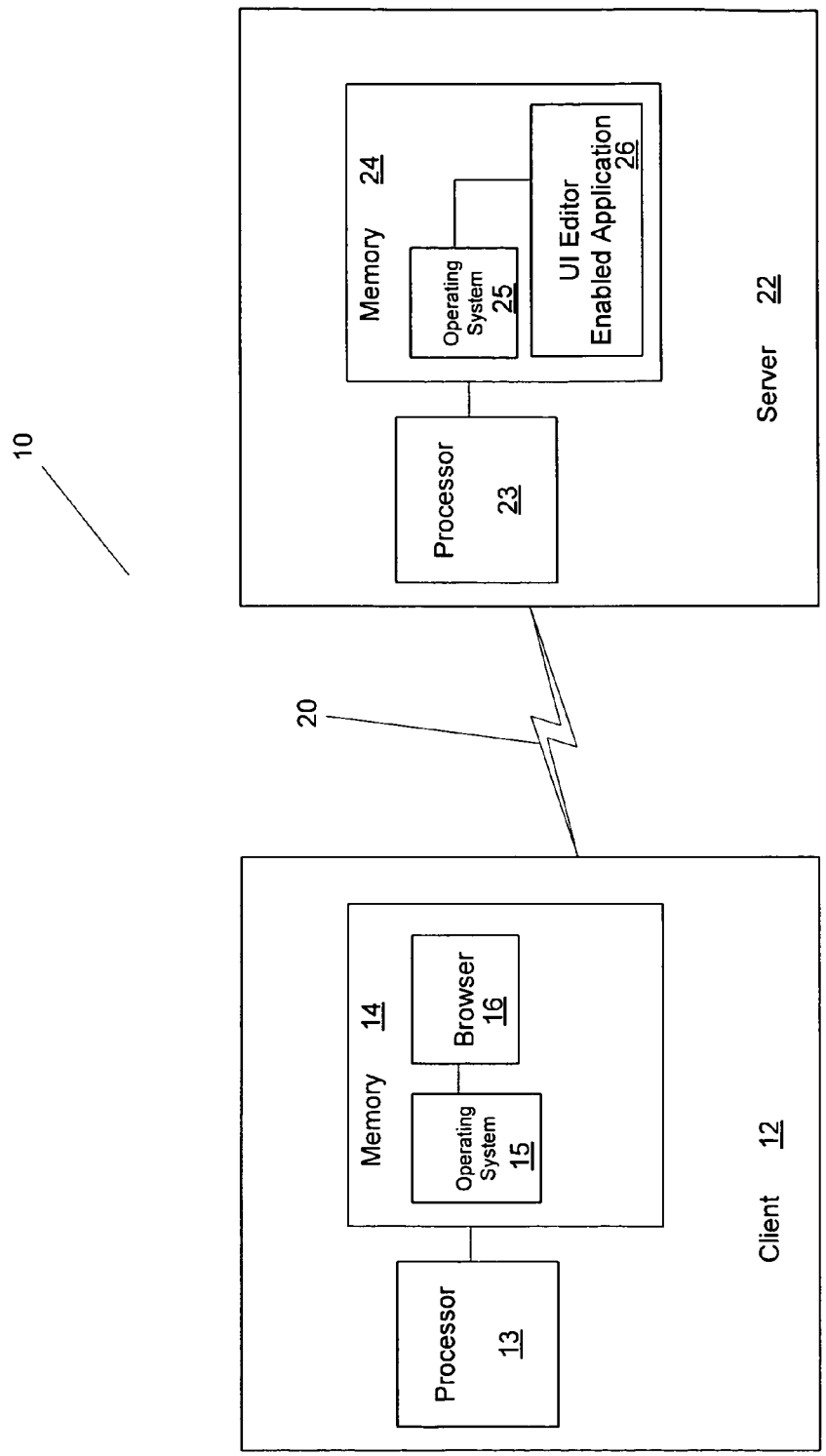
FIG. 1 is a block diagram of a system in accordance with one embodiment to provide a user interface with editable components.

FIG. 1 is a block diagram of a system 10 in accordance with one embodiment to provide a user interface with editable components. System 10 includes a client computer 12 that receives and displays a user interface ("UI") that includes one or more user interface components. Client computer 12 includes a processor 13 and memory 14. Processor 13 can be any type of specific or general purpose processor, and memory 14 can be any type of memory or other computer readable media that stores instructions that are executed by processor 13. Client 12 can be any type of computer or other computing device that can generate and display an Internet browser window or other type of graphical user interface ("GUI") or other type of UI, including a personal digital assistant ("PDA"), telephone, etc. In one embodiment, memory 14 includes an operating system 15 and an Internet browser 16.

Client 12 is coupled to a server computer 22 via a link 20. Link 20 is any type of local or network connection that enables client 12 to communicate and exchange data with server 22. In one embodiment, link 20 is the Internet and may be considered a computer readable medium. Server 22 includes a processor 23 and memory 24. Processor 23 can be any type of specific or general purpose processor, and memory 24 can be any type of memory or other computer readable media that stores instructions that are executed by processor 23. In one embodiment, memory 24 includes an operating system 25 and a UI editor enabled application 26. In another embodiment, a UI editor can be separate but coupled to an application in order to provide the editing functionality to the application.

In one embodiment, system 10 has a model-view-controller ("MVC") architecture. In general, an MVC architecture in a computer application separates data (the "model") and user interface (the "view") concerns, so that changes to the user interface will not affect data handling, and the data can be reorganized without changing the user interface. An intermediate component, the "controller", decouples data access and business logic from data presentation and user interaction.

In one embodiment, system 10 executes the JAVA Server Faces ("JSF") from Sun Microsystems, Inc, as an MVC framework. In this framework, the model is represented by Java beans, and the view is represented by a JAVA Server Page ("JSP"), which is implemented using JSF components. Each JSF page is represented by a tree of JSF components rooted at a single JSF component, the UIViewRoot. Sub-pieces of a page rooted at a single JSF component are called component subtrees. The JSF servlet functions as the controller. However, in other embodiments, any MVC framework may be used. Other embodiments can be implemented with other user MVC frameworks and user interface applications that include components, such as web-based frameworks (e.g., Microsoft ASP.NET, WebObjects, Apache Tapestry, Struts, etc.) or desktop frameworks (e.g., Microsoft Foundation Classes ("MFC") or JAVA Swing).

In one embodiment, UI editor enabled application 26 is an application that can be accessed on client 12 via browser 16 and has components that can be edited by a user at client 12.

Application 26 can be any type of application that includes a user interface and is accessible via a client. In other embodiments, UI editor enabled application 26 is stored in memory 14 of client 12 and server 22 is not needed. In one embodiment, the user interface of application 26 is formed by multiple JSF components or other types of components. The components may include user interface buttons, headers, footers, task bars, tabs, scrollbars, etc. One or more of these components may be edited by a user at client 12.

Figure 2:
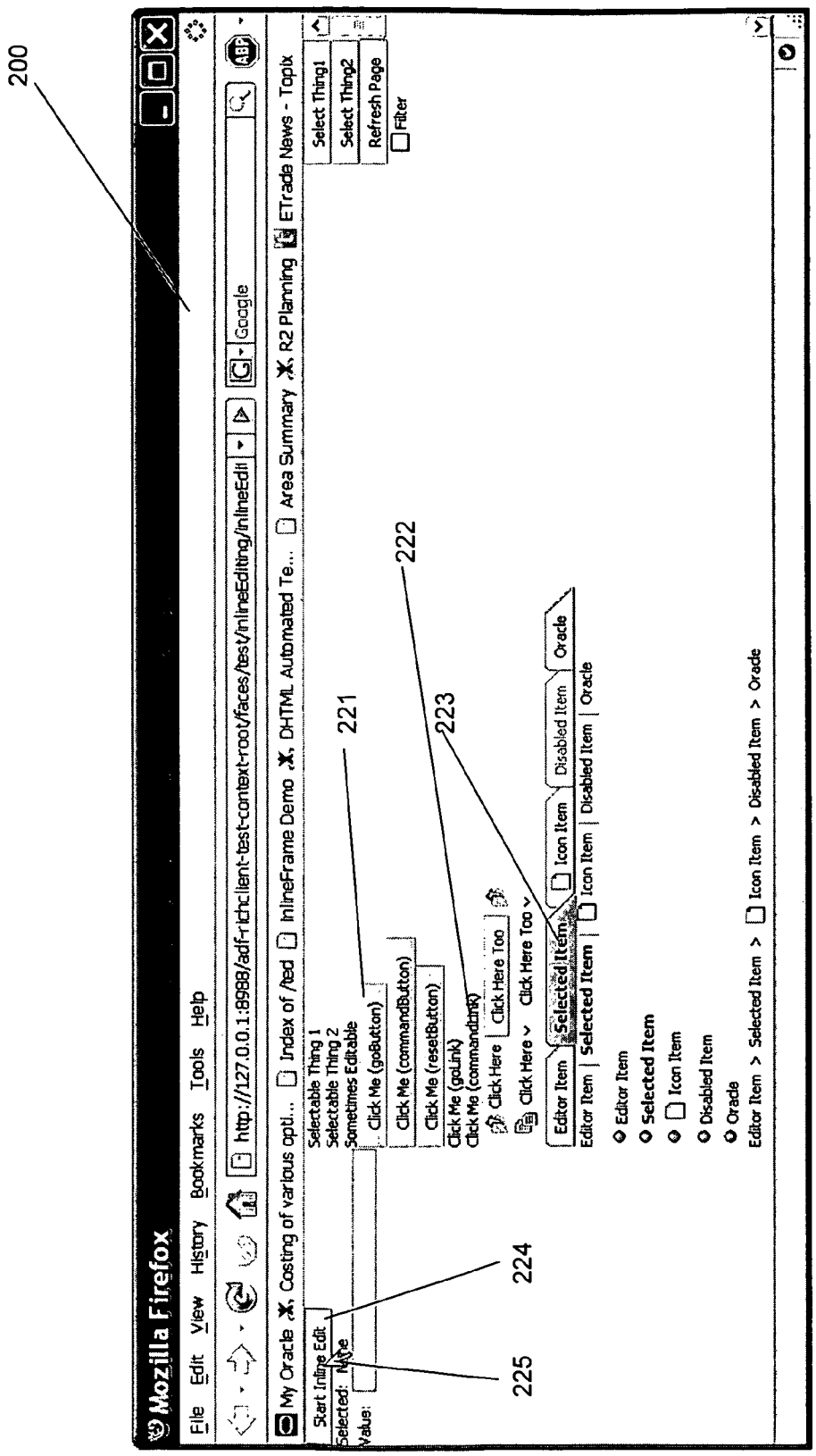
FIG. 2 is an editable user interface in accordance with one embodiment.

FIG. 2 is an editable UI 200 in accordance with one embodiment that is generated by application 26 and is displayed on browser 16 of client 12. UI 200 displays a subtree of a JSP page that is in an "edit" mode. UI 200 includes a plurality of components, including a button 221, a link 222, and a tab 223. UI 200 further includes a "Start Inline Edit" button 224 that can be selected by the user via a cursor 225 to begin the inline editing process of one or more components of UI 200. In other embodiments, choosing the editable subtrees may be accomplished through other user interface affordances.

Figure 3:
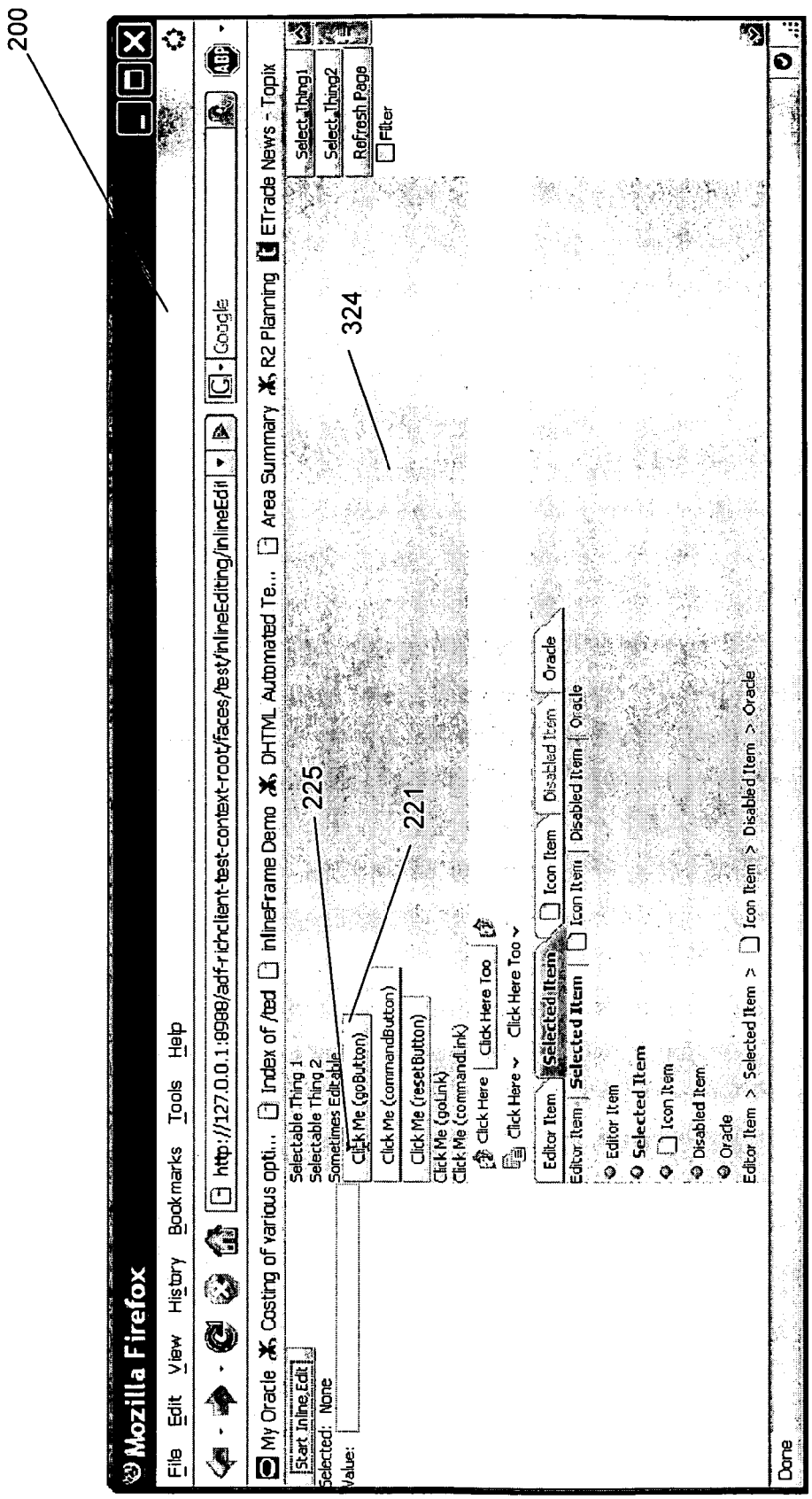
FIG. 3 illustrates the user interface of FIG. 2 when a button has been selected in accordance with one embodiment.

FIG. 3 illustrates UI 200 when button 221 has been selected in accordance with one embodiment. Cascading Style Sheets ("CSS") styles, such as shading 324, are applied to indicate the editable subsection of the page—the editable component subtree of UI 200 and editable and selectable components. As an example, button 221 is now editable, as indicated by cursor 225 being changed into an I-beam when over an editable component.

Figure 4:
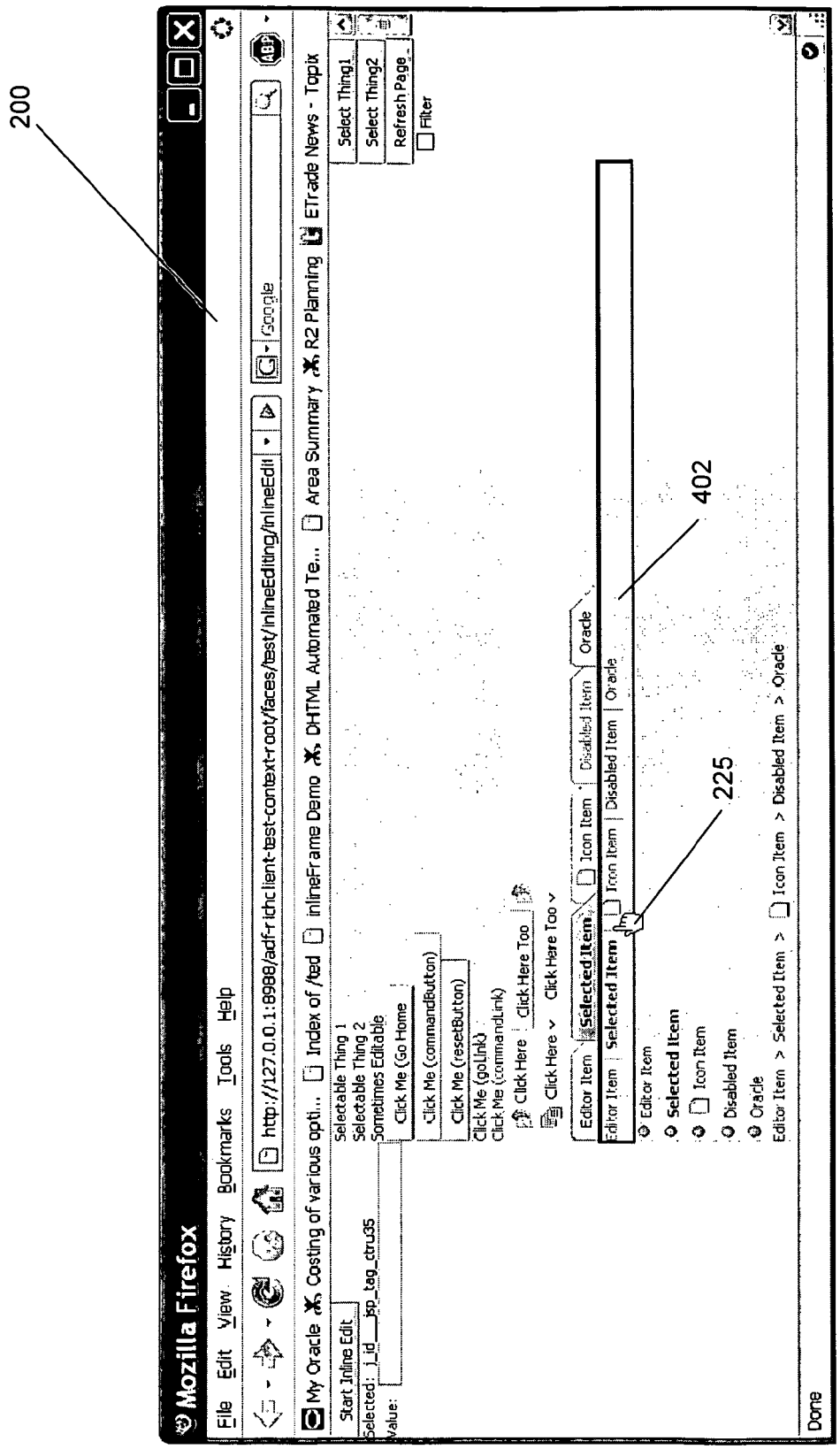
FIG. 4 illustrates the user interface of FIG. 2 when a selection is made by a user via the cursor of a component that does not support inline editing in accordance with one embodiment.

FIG. 4 illustrates UI 200 when a selection is made by a user via the cursor of a component (i.e., selection border 402) that does not support inline editing in accordance with one embodiment. The selection style is applied and cursor 225 becomes a pointer, indicating that only selection and not editing is allowed for that component.

Figure 5:
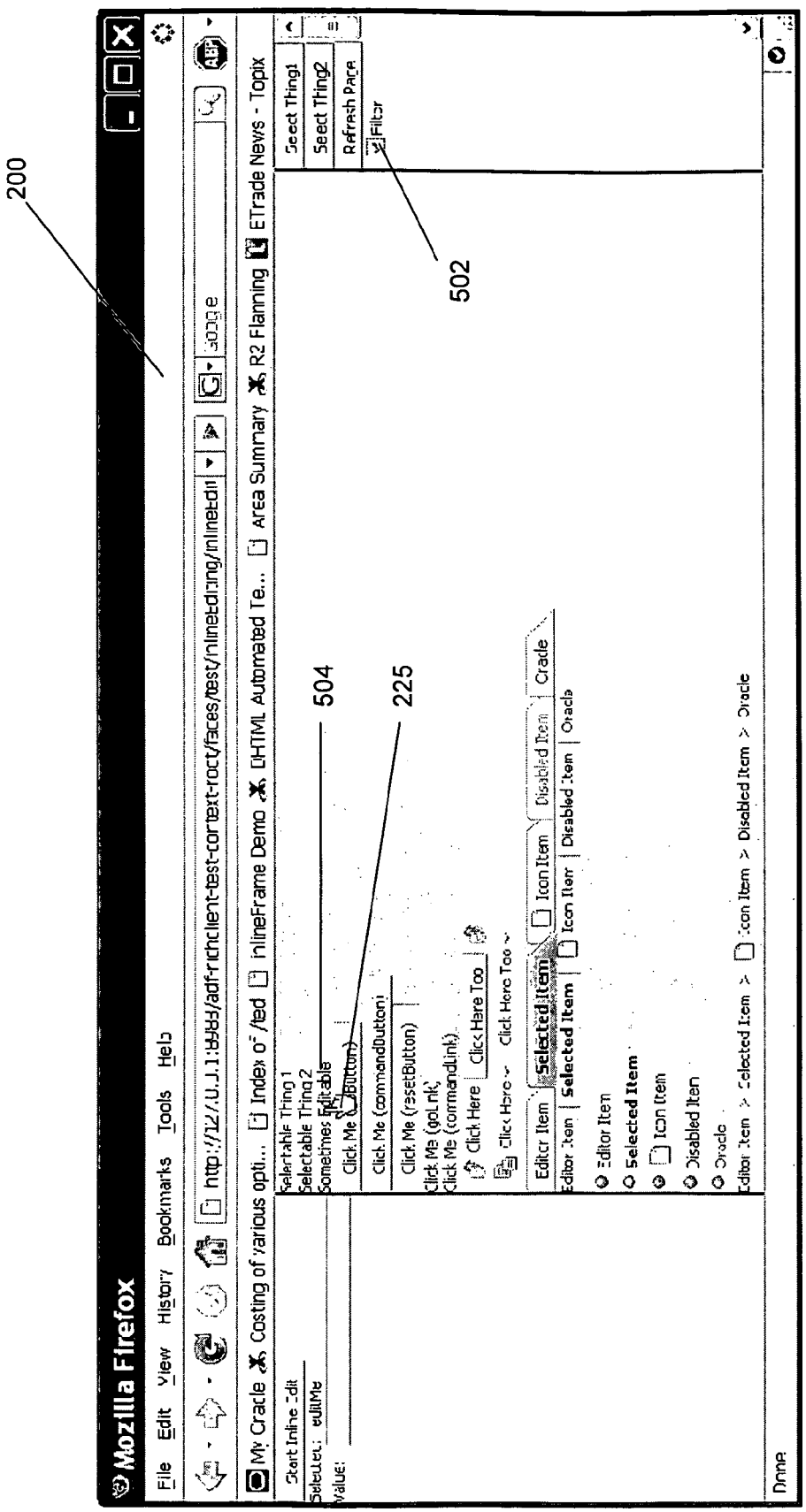
FIG. 5 illustrates the user interface of FIG. 2 when a component filter box is checked.

FIG. 5 illustrates UI 200 when a component filter box 502 is checked. When filter box 502 is selected, some components that by default would be editable are no longer editable. In this example, "Sometimes Editable" component 504 is not editable, as indicated by cursor 225 because box 502 is checked.

Figure 6:
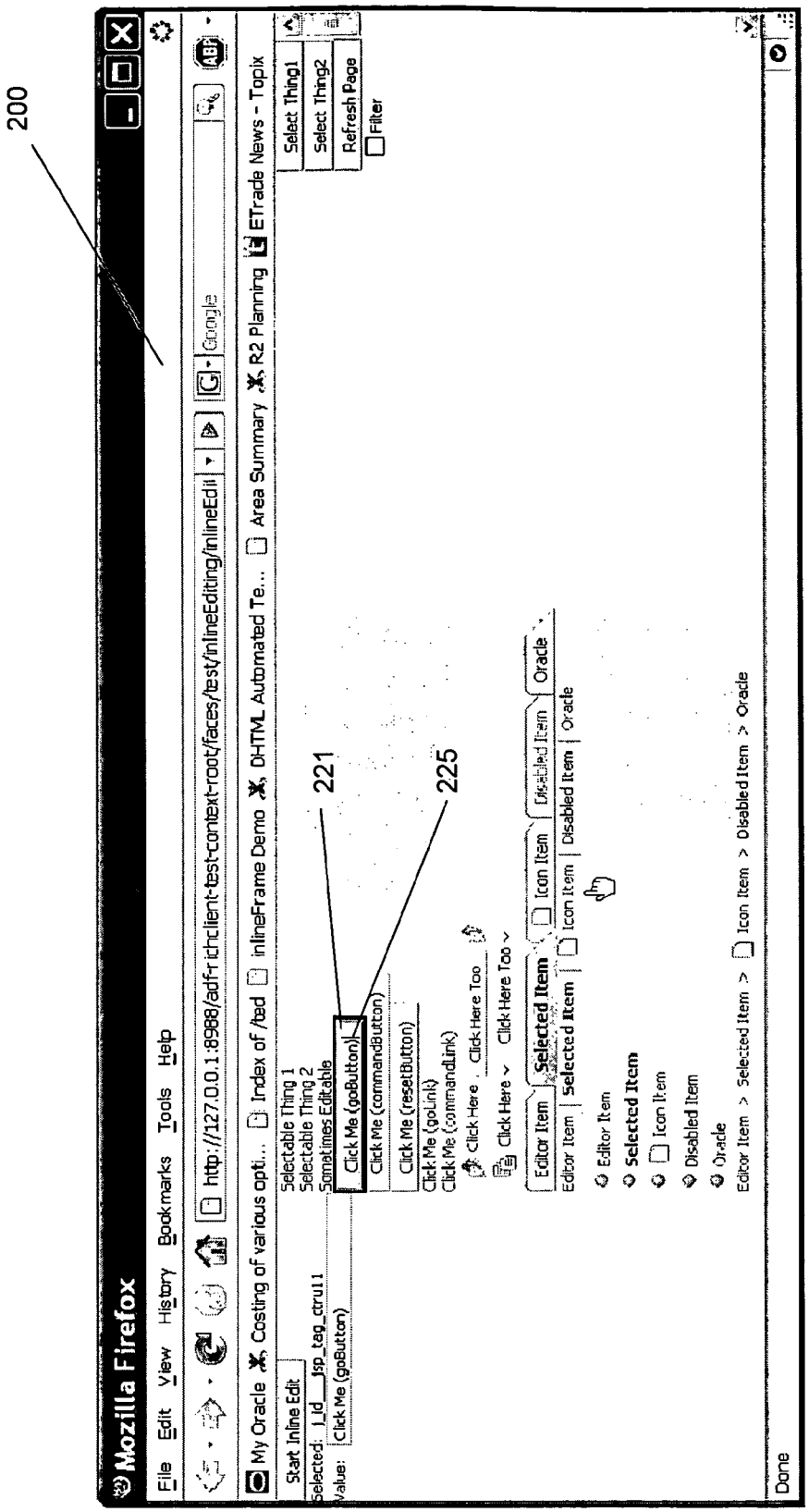
FIG. 6 illustrates the user interface of FIG. 2 when the "Click Me (goButton)" button has been selected and is in inline-editing mode.

FIG. 6 illustrates UI 200 when "Click Me (goButton)" button 221 has been selected and is in inline-editing mode, as indicated by cursor 225.

Figure 7:
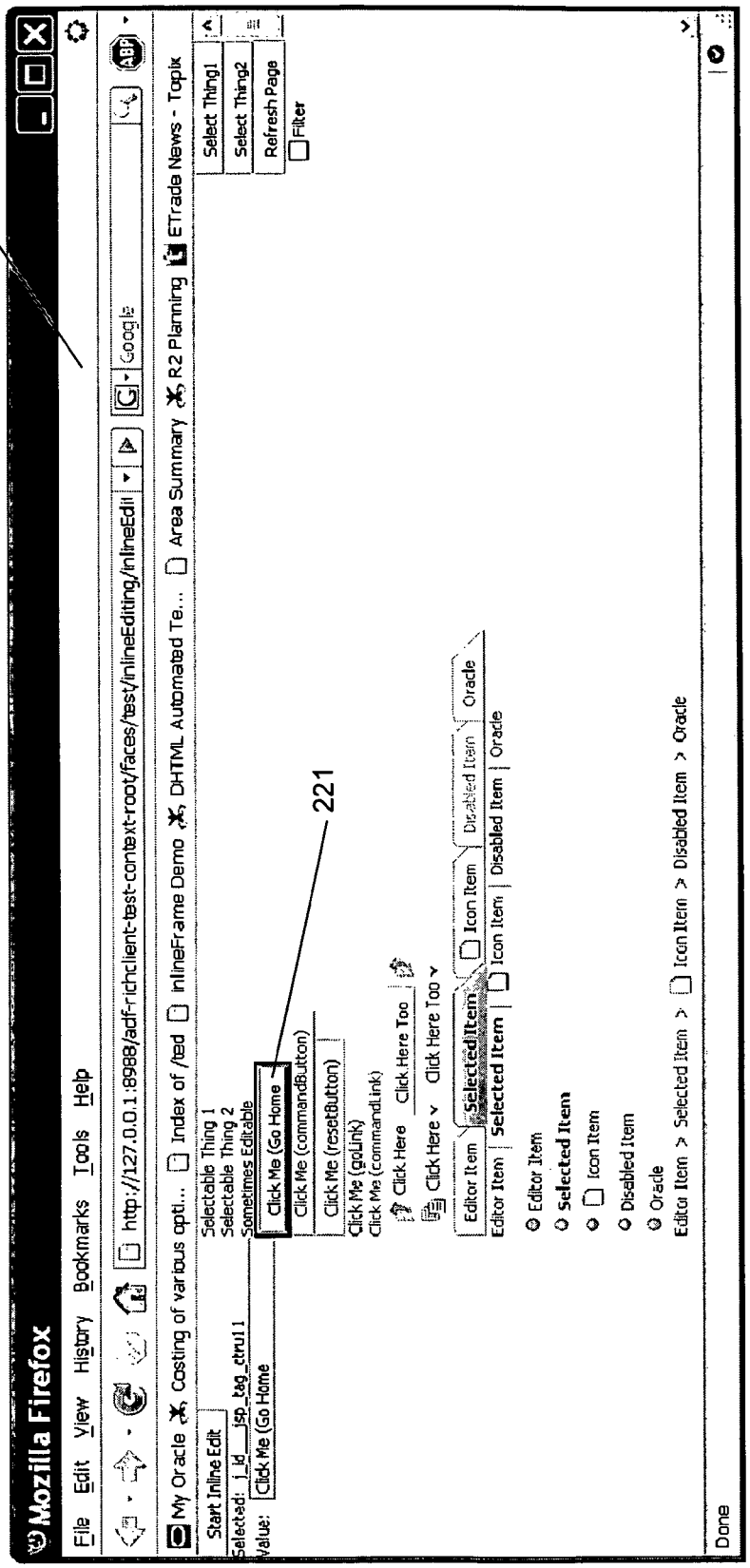
FIG. 7 illustrates the user interface of FIG. 2 in the middle of editing the button.

FIG. 7 illustrates UI 200 in the middle of editing button 221. The text has been changed to "Click Me (Go Home)".

Figure 8:
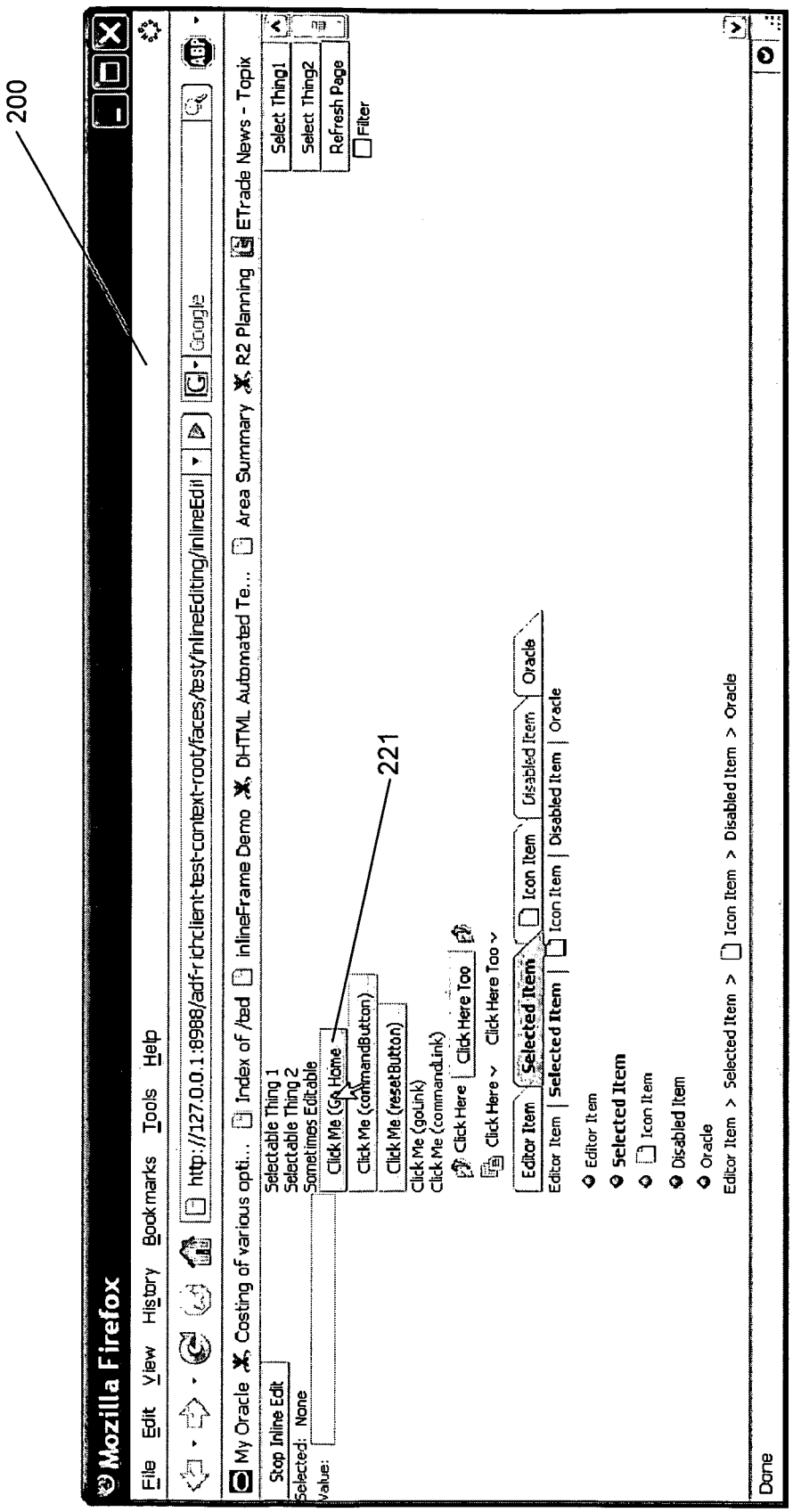
FIG. 8 illustrates the user interface of FIG. 2 after the user has completed editing the subtree.

FIG. 8 illustrates UI 200 after the user has completed editing the subtree. The editing styles have been removed and the edits to button 221 remains. Therefore, the user has been able to easily inline edit one or more components of UI 200. At this point, if the user clicked on button 221, the button would perform its normal action rather than start editing, since button 221 is no longer within an editable component subtree.

Figure 9:
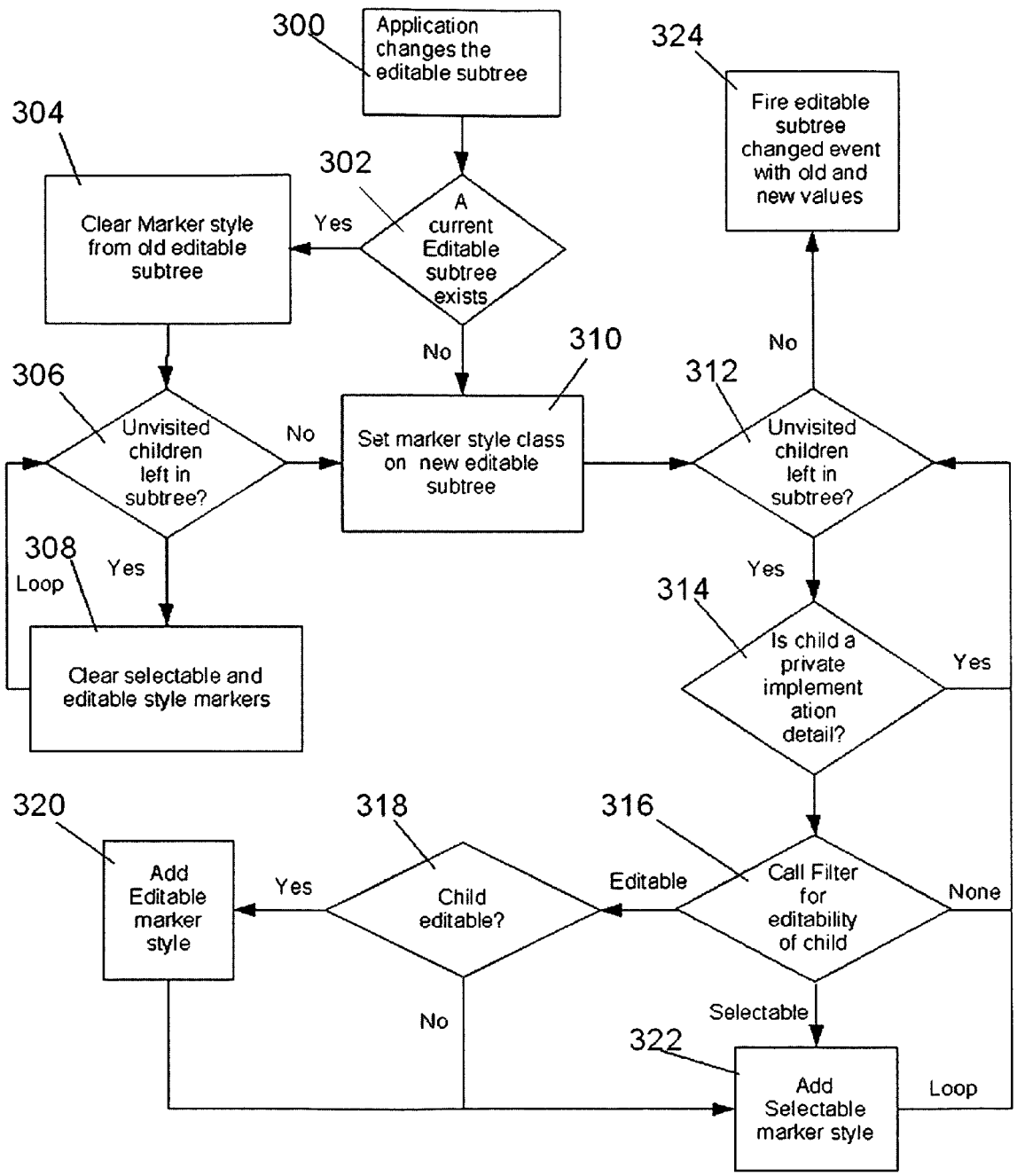
FIG. 9 is a flow diagram of the functionality of the system when enabling an editable component subtree of a user interface page for inline editing in accordance with one embodiment.
Figure 10:
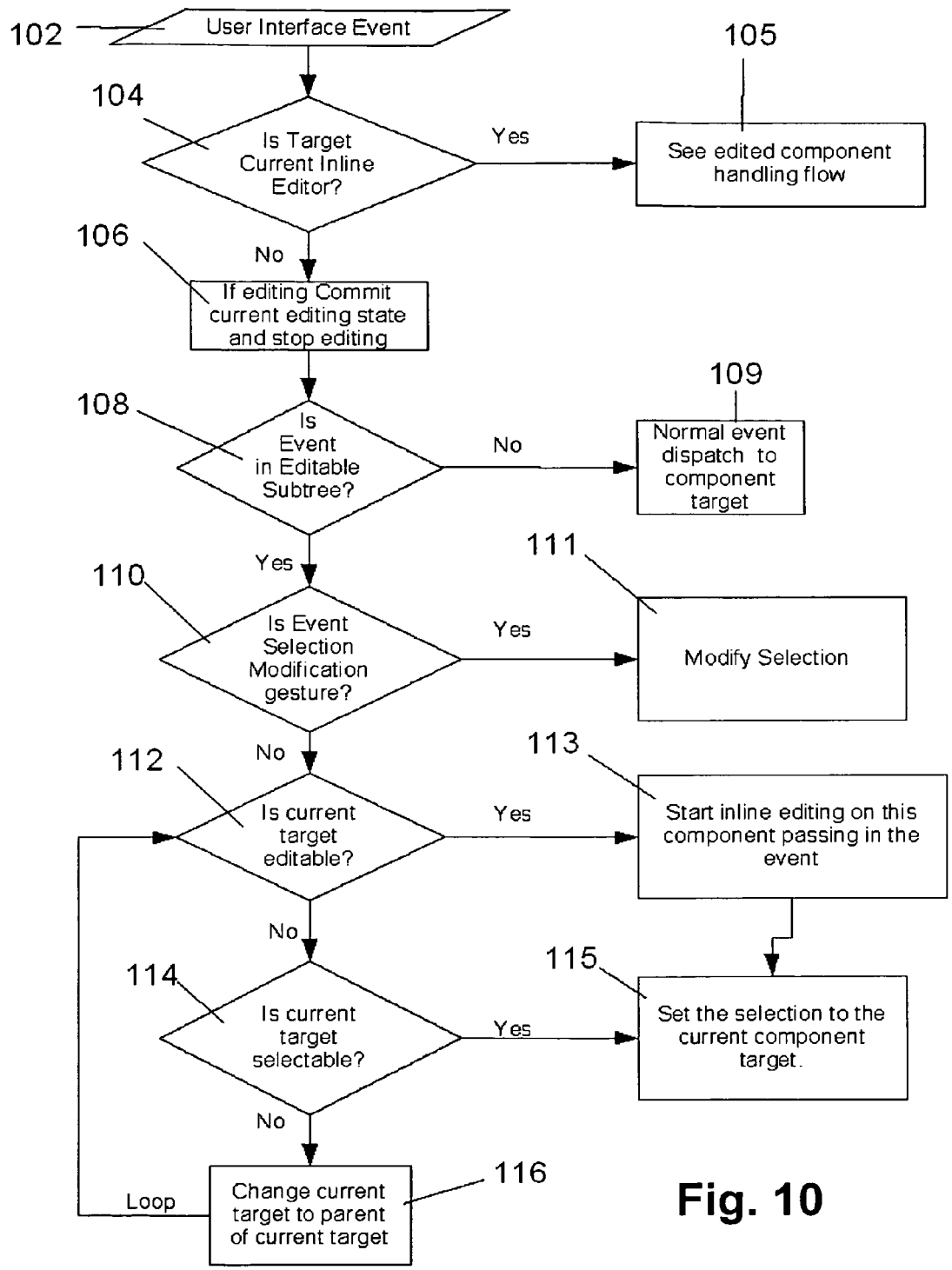
FIG. 10 is a flow diagram of the functionality of the system in handling user interface events on a page which includes an active inline editing component subtree in accordance with one embodiment.
Figure 11:
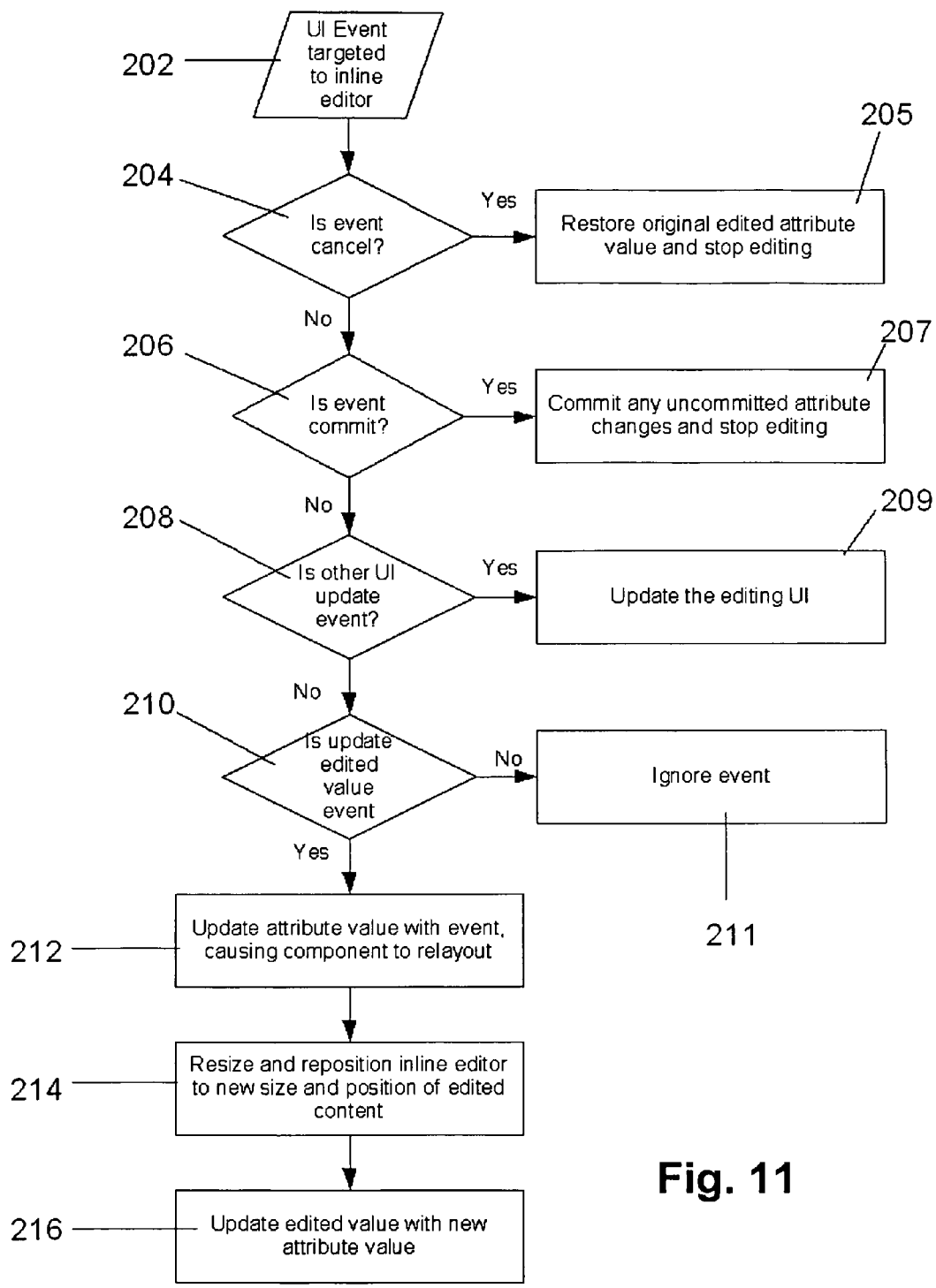
FIG. 11 is a flow diagram of the functionality of the system when handling user interface input events when the event is targeted at the currently active inline editor component in accordance with one embodiment.

FIG. 9 is a flow diagram of the functionality of system 10 when enabling an editable component subtree of a UI page for inline editing in accordance with one embodiment. In one embodiment, the functionality of the flow diagram of FIG. 9, and FIGS. 10 and 11, is implemented by software stored in memory or other computer readable or tangible medium, and executed by a processor. In other embodiments, the functionality can be performed by hardware, or any combination of hardware and software.

At 300, application 26 changes or specifies the root component of the component subtree to enable inline editing on.

At 302, the framework of system 10 checks if a different inline editing component subtree ("old inline editing subtree") is currently set. In one embodiment, only zero or one editable subtrees are allowed to exist at a time. In that embodiment, if an existing editable subtree exists, editing on that subtree needs to be disabled before enabling editing on the new subtree. If yes at 302, the old inline editing subtree is disabled.

At 304, the CSS style class used to highlight the editing subtree is cleared and removed from the old editable subtree root.

At 306-308, the component children of the inline editing subtree are walked depth first in a loop. The loop exits at 310.

At 308, any editable or selectable CSS style classes previously added at 320 and 322 are removed/cleared.

310 to 322 of FIG. 9 are directed to configuring a new editable subtree, if any, for editing.

At 310, the CSS style class used to highlight the editing subtree is set on the root component of the new editable subtree.

At 312 to 322, the component children of the new editable subtree are walked depth first.

At 314, it is determined whether the current component child is a private implementation detail of a public child. If it is, the child is skipped because the component does not exist in the application's definition of the page and thus can not be edited.

At 316, the framework calls any filter function that the application may have specified. The filter allows the application control over which components may be edited or selected. The filter returns whether the component is editable and selectable, selectable only, or neither selectable nor editable. If no filter is specified, the assumption is that any component capable of being edited can be edited by the user and all other components are selectable.

At 318, a potentially editable component is checked to determine whether it is capable of being edited by attempting to retrieve an inline editor object for the component. If no inline editor exists for this component, the component is not editable.

At 320, the component is determined to be editable, and an editable CSS marker style is added to the component's root Document Object Model ("DOM") node to show the user that this component is editable.

At 322, a component is marked as selectable by adding a selectable CSS marker style to the component's root DOM node. Since editable components are also selectable, an editable component will have both editable and selectable CSS style classes attached after this step.

At 324, the work to clear the old editable subtree and configure the new editable subtree has been completed and an event to notify listeners of the change is fired. This allows an application to know when to show any additional editing tools (such as property inspectors, component palettes, and structure panes) relevant to the current editable component subtree.

FIG. 10 is a flow diagram of the functionality of system 10 in handling user interface events on a page which includes an active inline editing component subtree in accordance with one embodiment.

At 102, browser 16 delivers a DOM user interface event (e.g., a mouse click or key press) to the framework.

At 104, the framework determines if the target of the DOM user interface event is in the currently displayed inline editor, if any. If it is in the inline editor, the event is dispatched to the inline editor for handling, disclosed in detail in FIG. 11 below.

At 106, since the event is not for the current inline editor, this implies that the user is done with any current editing. If there is a current inline editor, its current editing value is committed, the editor is closed, and an event is dispatched to any registered listeners indicating that no inline editor is currently displayed.

At 108, the framework determines whether the event is targeted inside the current editable component subtree, if any. If it is not, then at 109 the event is dispatched as normal to the target allowing normal user interaction with components outside of the editable subtree. This enables these areas to host components that manage the editing experience, such as property inspectors and structure viewers or allow these non-editable areas to contain other application-specific functionality, such as application navigation.

At 110, it is known that the event is targeted at the editable subtree and it needs to be determined whether the user is attempting to modify the current selection or is starting a new editing operation. If the user interface event represents a gesture that explicitly modifies selection (e.g., a shift-click to extend selection or control-click to toggle selection on many windowing systems), the selection is modified at 111.

At 111, if the gesture is selection extension, then all of the selectable components between the last selected component and the currently selected component in a depth first walk of the component tree will be selected. If no component is currently selected, the clicked on component will be selected if it is selectable. If the gesture represents a selection toggle, the clicked component will be deselected if currently selected and selected if currently deselected and selectable. If the operations actually result in a change to the set of selected components, an event with the old and new sets of selected components will be delivered. Firing "selection changed" events allows other editing tools, unknown to the editing framework itself, to update their state as appropriate. For example, a component tree structure viewer may highlight the currently selected nodes in its tree structure, or a property inspector may display the attribute values of the currently selected components.

At 112, if the current component target of the event is editable as marked at box 320 of FIG. 9, editing is initiated.

At 113, editing is initiated by sending a "startEdit" message to the component's inline editing strategy object and passing the component to edit and the user interface input event that triggered the editing to the editor. Passing the triggering event allows a component that has multiple different editable sections to pick the correct editor to use for the targeted section. It also allows the editor to set up a better initial editing state, by enabling the editor to correctly position a text insertion cursor, for example.

At 115, the current edited component is set to the target component and a change event with the old and new values of the currently edited component is fired.

For any attributes that the inline editor is editing, it stores the original values in case these need to be restored later (e.g., at 205 in FIG. 11 below).

At 114, the selectability of the non-editable component is checked as marked at box 322 of FIG. 9. If the component is selectable it is selected at 115.

At 115, the selection is set to the component that is the target of the input event. Any previously selected components are de-selected and a selection change event containing the list of previously selected and the newly selected component is fired.

At 116, the current component was neither editable nor selectable so the current target to the parent of the current component is changed and the loop is executed again at 112. If the current target is the root of the editable subtree, the loop is exited and the event is ignored.

FIG. 11 is a flow diagram of the functionality of system 10 when handling user interface input events when the event is targeted at the currently active inline editor component in accordance with one embodiment.

At 202, the inline editor receives an event targeted at its user interface structure.

At 204, the inline editor checks whether it should interpret the event as indicating that editing should be canceled. For example, the inline editor might interpret the escape key as indicating cancel, for instance, or might expose a "cancel editing" button.

At 205, the inline editor has interpreted the event as cancel and has restored the values of any edited attributes of the component to their values at the time that editing started and stops editing, hiding the inline editor, setting the current edited component to null and firing the appropriate change event.

At 206, the inline editor checks whether it should interpret the event as indicating that the current value of the input should be committed. For example, the inline editor might interpret the enter key as indicating commit or might expose a commit button. While most editors post editing changes as soon as possible, more complicated editors that need a value to pass through a temporarily invalid state might defer posting changes until explicitly committed by the user.

At 207, the inline editor has interpreted the event as commit and has set the current edited values of any edited attributes on the component. If these sets succeed without any exceptions, the current edited component is set to null and the current edited component change event is fired. If the commit fails, the editor is still displayed and editing continues.

At 208, the inline editor checks whether the event is targeted at a part of its user interface that does not directly edit an attribute of the edited component (e.g., a button that exposes additional advanced editing controls).

At 209, the inline editor handles the event on the additional editing user interface elements from 208 and updates its state.

At 210, the inline editor checks whether the target of the event is one of its controls that directly edit the value of a component attribute. For example, a key press event targeted at a text field used to edit the label of the checkbox component.

At 211, any event targeted at the inline editor did not affect any of the parts of the inline editor that react to user input is discarded.

At 212, the event that updates edited attribute values is interpreted as a change to the attribute value and the new value for this attribute is set on the component, which typically updates its appearance to reflect the new value.

At 214, in response to the change to the attribute, the size and position of the different edited parts of the edited component may have changed. For example, the label of an edited checkbox may have become larger if a character was added to it. The inline editor can reposition and resize its edited components to correctly mimic these changes.

At 216, the inline editor retrieves the new value from the component and updates its value with this new value. This allows the editor to track any changes that the component made to the attribute value set by the inline editor and also allows the inline editor to respond to changes made to the edited attributes by parts of the system unknown to the inline editor.

As disclosed, embodiments allow a user to selectively edit components of the user interface in order to customize the user interface. The editing may include changing the text that is used to identify the components, or other component attribute changes such as size, color, font, accelerator key, visibility, tab order, etc.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to:
generate a first user interface for an end user of an application, wherein the first user interface comprises a plurality of user interface components organized in a tree structure comprising a root component and a plurality of component subtrees;
in response to a request from the end user to edit the first user interface, generate an editable user interface that comprises an indication that at least one component subtree of the first user interface is editable and selectable, wherein the indication comprises adding a style to a root of the subtree;
receive inline editing input from the end user for a first component of the editable component subtree; and
update the first component based on the editing input so that a visual attribute of the first component when displayed on the first user interface is changed;
wherein the first component comprises a button and text within the button, and wherein the inline editing input comprises, while the first component is displayed on the user interface, positioning a cursor within the text and within the button and revising the text;
wherein the changed visual attribute is the revised text;
wherein the user interface components comprise at least one of the button, a taskbar or a tab.

2. The computer readable medium of claim 1, wherein the first user interface is generated on a client computer that is remote from the processor.

3. The computer readable medium of claim 1, wherein the first user interface is generated in a model-view-controller architecture.

4. The computer readable medium of claim 1, wherein when the first component is determined to be editable, an editable Cascading Style Sheets style is added to a root Document Object Model node of the first component.

5. The computer readable medium of claim 1, wherein the editing input is a change of text on the first component.

6. The computer readable medium of claim 1, the instructions further causing the processor to indicate at least one of the plurality of components is sometimes editable.

7. The computer readable medium of claim 1, the instructions further causing the processor to provide a filter that returns whether a component is editable.

8. The computer readable medium of claim 1, wherein the indication that at least one component subtree is editable comprises a cursor.

9. The computer readable medium of claim 1, wherein the indication that at least one component subtree is editable comprises an application of the style.

10. The computer readable medium of claim 9, wherein the style is a shading of an area around the at least one of the user interface components.

11. A computer implemented method of implementing an application comprising:
generating a first user interface for an end user of the application, wherein the first user interface comprises a plurality of user interface components organized in a tree structure comprising a root component and a plurality of component subtrees;
in response to a request from the end user to edit the first user interface, generating an editable user interface that comprises an indication that at least one component subtree of the first user interface is editable and selectable, wherein the indication comprises adding a style to a root of the subtree;
receiving an inline edit from the end user for a first component that is editable; and
updating the first component based on the edit so that a visual attribute of the first component when displayed on the first user interface is changed;
wherein the first component comprises a button and text within the button, and wherein the inline editing input comprises, while the first component is displayed on the user interface, positioning a cursor within the text and within the button and revising the text;
wherein the changed visual attribute is the revised text;
wherein the user interface components comprise at least one of the button, a taskbar or a tab.

12. The method of claim 11, wherein the application is executed on a server and the first user interface is displayed on a client, and wherein the edit is received from the end user at the client.

13. The method of claim 11, wherein the edit is a change of text on the first component.

14. The method of claim 11, wherein the first user interface is generated in a model-view-controller architecture.

15. A system comprising:
a processor;
a non-transitory memory coupled to the processor and storing instructions executed by the processor, the instructions comprising:
means for generating a first user interface for an end user of an application, wherein the first user interface comprises a plurality of user interface components organized in a tree structure comprising a root component and a plurality of component subtrees;
in response to a request from the end user to edit the first user interface, means for generating an editable user interface that comprises an indication that at least one component subtree of the first user interface is editable and selectable, wherein the indication comprises adding a style to a root of the subtree;
means for receiving an inline edit from the end user for a first component that is editable; and
means for updating the first component based on the edit so that a visual attribute of the first component when displayed on the first user interface is changed;
wherein the first component comprises a button and text within the button, and wherein the inline editing input comprises, while the first component is displayed on the user interface, positioning a cursor within the text and within the button and revising the text;
wherein the changed visual attribute is the revised text;
wherein the user interface components comprise at least one of the button, a taskbar or a tab.

16. The method of claim 11, further comprising receiving a gesture that modifies a selection.

17. The system of claim 15, wherein the first user interface is generated in a model-view-controller architecture.

18. The method of claim 11, further comprising indicating at least one of the plurality of user interface components is sometimes editable.

19. The method of claim 11, further comprising providing a filter that returns whether a user interface component is editable.

20. The method of claim 11, wherein when the first component is determined to be editable, an editable Cascading Style Sheets style is added to a root Document Object Model node of the first component.

* * * * *

UNITED STATES PATENT AND TRADEMARK OFFICE
CERTIFICATE OF CORRECTION

PATENT NO. : 8,504,929 B2  
APPLICATION NO. : 12/101606  
DATED : August 6, 2013  
INVENTOR(S) : Sullivan et al.

Page 1 of 1

It is certified that error appears in the above-identified patent and that said Letters Patent is hereby corrected as shown below:

On Title page 2, Item (56) column 2, under other publications, line 12, delete "form" and insert -- from --, therefor.

On Title page 2, Item (56) column 2, under other publications, line 14, delete "SSA" and insert -- SAS --, therefor.

In the Specification

In column 2, line 50, delete "Inc," and insert -- Inc. --, therefor.

In column 3, line 44, delete "(Go Home"." and insert -- (Go Home)". --, therefor.

Signed and Sealed this  
Nineteenth Day of November, 2013

Teresa Stanek Rea  
*Deputy Director of the United States Patent and Trademark Office*